United States Patent
Tsuge et al.

(10) Patent No.: US 8,947,075 B2
(45) Date of Patent: Feb. 3, 2015

(54) VARIABLE RELUCTANCE TYPE ANGLE SENSOR

(75) Inventors: Noboru Tsuge, Kariya (JP); Nobuo Shiba, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 307 days.

(21) Appl. No.: 13/537,375

(22) Filed: Jun. 29, 2012

(65) Prior Publication Data

US 2013/0009631 A1 Jan. 10, 2013

(30) Foreign Application Priority Data

Jul. 5, 2011 (JP) ................... 2011-149308
Nov. 17, 2011 (JP) ................... 2011-251856
Nov. 17, 2011 (JP) ................... 2011-251857
Jun. 27, 2012 (JP) ................... 2012-144421
Jun. 27, 2012 (JP) ................... 2012-144422

(51) Int. Cl.
*G01B 7/30* (2006.01)
*G01D 5/20* (2006.01)

(52) U.S. Cl.
CPC .................... *G01D 5/2046* (2013.01)
USPC ................... 324/207.18; 324/207.25

(58) Field of Classification Search
CPC .. G01D 5/2291; G01D 5/2046; G01D 5/2216
USPC ...................................... 324/207.18
See application file for complete search history.

(56) References Cited

U.S. PATENT DOCUMENTS

| | | | |
|---|---|---|---|
| 4,604,575 A * | 8/1986 | Shimizu et al. ........... | 324/207.18 |
| 5,300,884 A * | 4/1994 | Maestre ................... | 324/207.25 |
| 6,078,161 A * | 6/2000 | Kim et al. .................... | 318/701 |
| 2003/0102862 A1* | 6/2003 | Goto et al. ................ | 324/207.16 |
| 2009/0179632 A1* | 7/2009 | Nishiguchi et al. ....... | 324/207.25 |

FOREIGN PATENT DOCUMENTS

JP 58-207850 12/1983

* cited by examiner

*Primary Examiner* — Jay Patidar
(74) *Attorney, Agent, or Firm* — Christensen Fonder PA (57) ABSTRACT

A variable reluctance angle sensor includes a stator, a rotor, and a computation section. The stator includes a core member having teeth, which are arranged in a circumferential direction, and excitation coils, which are respectively wound about the teeth such that magnetic poles of the teeth have different polarities alternately in the circumferential direction. An input voltage is supplied to the excitation coils. The rotor radially faces the teeth of the stator. The rotor has a shape such that gap permeance with respect to the stator changes in a sinusoidal fashion in accordance with the rotational angle of the rotor. The computation section obtains output voltages of two or more phases having different phases based on the voltages of the excitation coils, and detects the rotational angle of the rotor based on the output voltages.

6 Claims, 13 Drawing Sheets

• Reverse Winding

• Reverse Winding

Rotation Electrical Angle of Rotor (θ)

US 8,947,075 B2

VARIABLE RELUCTANCE TYPE ANGLE SENSOR

BACKGROUND OF THE INVENTION

The present invention relates to a variable reluctance type angle sensor.

A conventional variable reluctance type angle sensor is disclosed in, for example, Japanese Laid-Open Patent Publication No. 58-207850. The sensor includes a stator formed by winding an excitation coil and output coils of two phases (sine phase output coil and cosine phase output coil) around teeth arranged in the circumferential direction. Also, the sensor includes a rotor, which radially faces the teeth of the stator and has a shape such that the gap permeance with respect to the stator changes in a sinusoidal fashion in accordance with its rotational angle. The output winding of each phase is wound about the corresponding tooth by concentrated winding and forms the output coil. An induced voltage is generated in each output coil due to changes in the magnetic flux caused by rotation of the rotor. The total sum of the induced voltages of the output coils of each phase is obtained as the output voltage of the output winding of each phase. The rotational angle of the rotor can be detected based on the output voltage from the output winding of each phase, which changes in a sinusoidal fashion in accordance with rotation of the rotor.

However, three types of windings including the excitation coil and the output windings of two phases are required in the above-mentioned variable reluctance type angle sensor, and the structure of the sensor is complicated.

SUMMARY OF THE INVENTION

Accordingly, it is an objective of the present invention to provide a variable reluctance type angle sensor that has a simple structure.

To achieve the foregoing objective and in accordance with a first aspect of the present invention, a variable reluctance type angle sensor that includes a stator, a rotor, and a computation section is provided. The stator includes a core member, which has a plurality of teeth arranged in a circumferential direction, and a plurality of excitation coils respectively wound about the teeth such that magnetic poles of the teeth have different polarities alternately in the circumferential direction. An input voltage is supplied to the excitation coils. The rotor radially faces the teeth of the stator. The rotor has a shape such that gap permeance with respect to the stator changes in a sinusoidal fashion in accordance with the rotational angle of the rotor. The computation section obtains output voltages of two or more phases having different phases based on the voltages of the excitation coils and detects the rotational angle of the rotor based on the output voltages.

In accordance with a second aspect of the present invention, a variable reluctance type angle sensor that includes a stator, a rotor, and a computation section is provided. The stator includes a core member, which has a plurality of teeth arranged in a circumferential direction, and a plurality of excitation coils respectively wound about the teeth such that magnetic poles of the teeth have different polarities alternately in the circumferential direction. An input voltage is supplied to the excitation coils. The rotor radially faces the teeth of the stator. The rotor has a shape such that gap permeance with respect to the stator changes in a sinusoidal fashion in accordance with the rotational angle of the rotor. The computation section obtains a first phase output voltage based on the voltage of a first excitation coil group including one or a plurality of the excitation coils, a second phase output voltage based on the voltage of a second excitation coil group including one or a plurality of the excitation coils, and a third phase output voltage based on a third excitation coil group including one or a plurality of the excitation coils. The first to third phase output voltages are generated such that a phase difference occurs among the first to third phase output voltages. The computation section detects the rotational angle of the rotor based on the first to third phase output voltages.

DETAILED DESCRIPTION OF THE PREFERRED EMBODIMENTS

First Embodiment

A first embodiment of the present invention will now be described with reference to the drawings.

Figure 1:
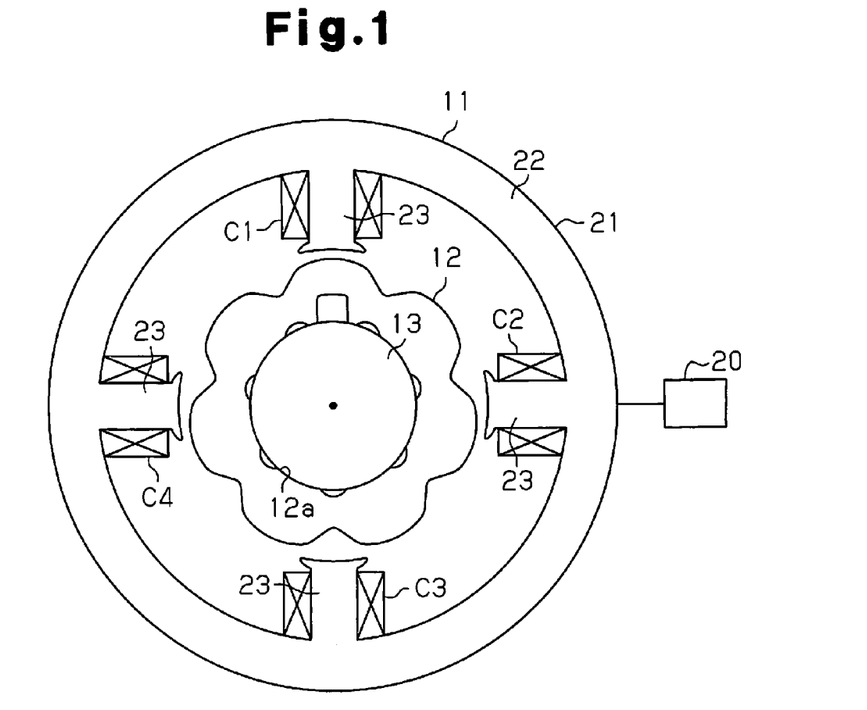
FIG. 1 is a schematic diagram illustrating a variable reluctance type angle sensor according to a first embodiment.

As shown in FIG. 1, a variable reluctance type angle sensor of the first embodiment includes an annular stator 11 and a rotor 12, which is rotationally mounted on the inner circumference of the stator 11.

For example, a rotary shaft 13 of a motor is press-fitted in a mounting hole 12a formed at the center of the rotor 12, and the rotor 12 rotates integrally with the rotary shaft 13. Recesses and protrusions are formed on the outer circumferential surface of the rotor 12 in the circumferential direction. Due to the recesses and the protrusions, the rotor 12 has such a shape that gap permeance with respect to the stator 11 varies in a sinusoidal fashion in accordance with the rotation electrical angle θ of the rotor 12. In the rotation electrical angle θ, one cycle of sinusoid signal generated by the rotor 12 is defined as 360 degrees. In the present invention, an interval between two adjacent recesses or an interval between two adjacent protrusions in the circumferential direction of the rotor 12, which generates the sinusoid signal, is defined as 360 degrees. In the first embodiment, seven protrusions are formed on the outer circumferential surface of the rotor 12 so that output signals for seven cycles are obtained when the rotor 12 is rotated once (that is, the multiplication factor of angle is 7×). The multiplication factor of angle of the rotor 12 is set to 7 times (7×). Thus, when the rotor 12 is rotated once (rotation mechanical angle of 360 degrees), the rotation electrical angle θ is equal to 360 degrees multiplied by 7, which is 2520 degrees.

The stator 11 includes four teeth 23, which project radially inward from an annular portion 22 of a core member 21 and are arranged at equal intervals (630 degree intervals in terms of the electrical angle, and 90 degree intervals in terms of the mechanical angle) in the circumferential direction. Slots are formed between the teeth 23. A first coil C1, a second coil C2, a third coil C3, and a fourth coil C4 are respectively wound about the four teeth 23 clockwise in this order via non-illustrated insulators.

Figure 2:
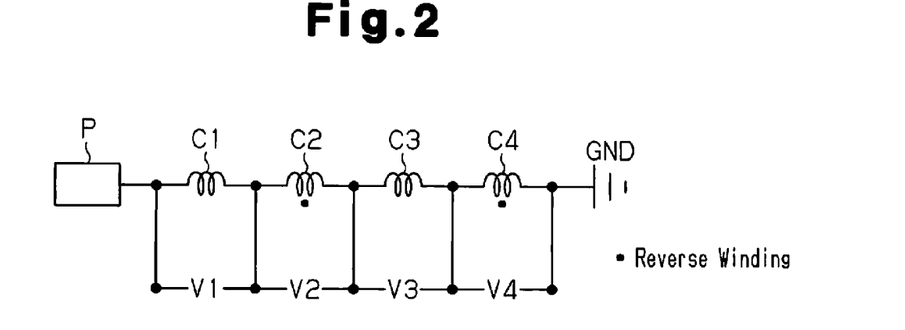
FIG. 2 is a schematic diagram illustrating the connection of the coils of the first embodiment.

The first to fourth coils C1 to C4 are formed by continuously winding one conductive wire about the four teeth 23 by concentrated winding. That is, the first to fourth coils C1 to C4 are connected in series as shown in FIG. 2. Also, the first and third coils C1, C3 are wound by forward winding, and the second and fourth coils C2, C4 are wound by reverse winding. Accordingly, the circumferentially adjacent coils of the first to fourth coils C1 to C4 have different polarities from each other. The number of windings of the first to fourth coils C1 to C4 is set to be all equal.

The starting end of the first coil C1 is an input end, and the starting end is connected to a power source P. The trailing end of the fourth coil C4 is grounded. The power source P supplies an excitation voltage (alternating voltage) having a frequency of 5 kHz, the amplitude of ±2 V. Also, the first to fourth coils C1 to C4 are formed to be capable of obtaining respective voltages V1 to V4. The voltages V1 to V4 of the coils C1 to C4 are output to a computation section, which is a control section 20 (FIG. 1) in the first embodiment.

The operations of the first embodiment will now be described.

In the above-mentioned variable reluctance type angle sensor, when the rotary shaft 13 and the rotor 12 are rotated, magnetic flux change occurs in each of the teeth 23 (each of the coils C1 to C4) due to changes in the gap permeance associated with the rotation, and the voltages V1 to V4 of the first to fourth coils C1 to C4 change accordingly.

Figure 3A:
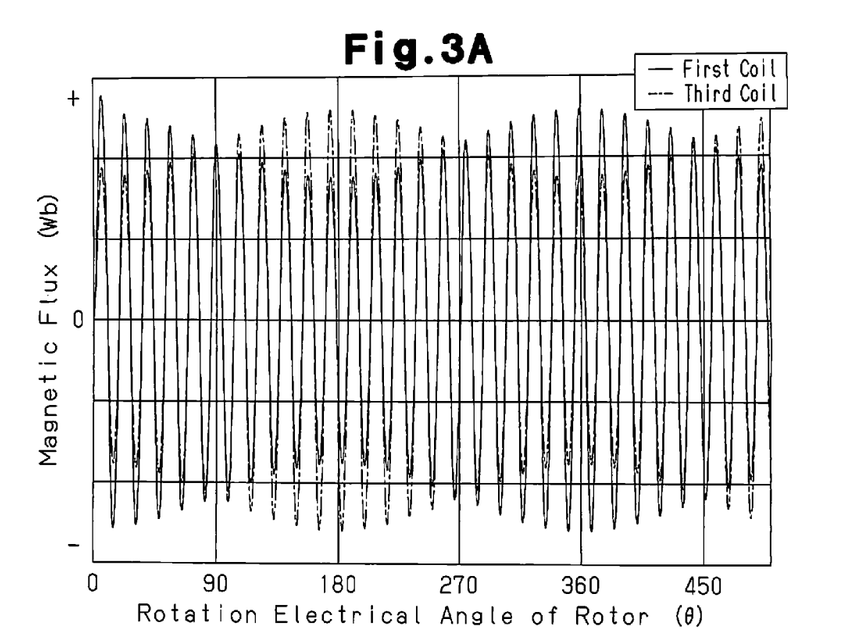
FIG. 3A is a graph showing the change characteristics of the magnetic flux of the coils when the rotor is rotating.
Figure 3B:
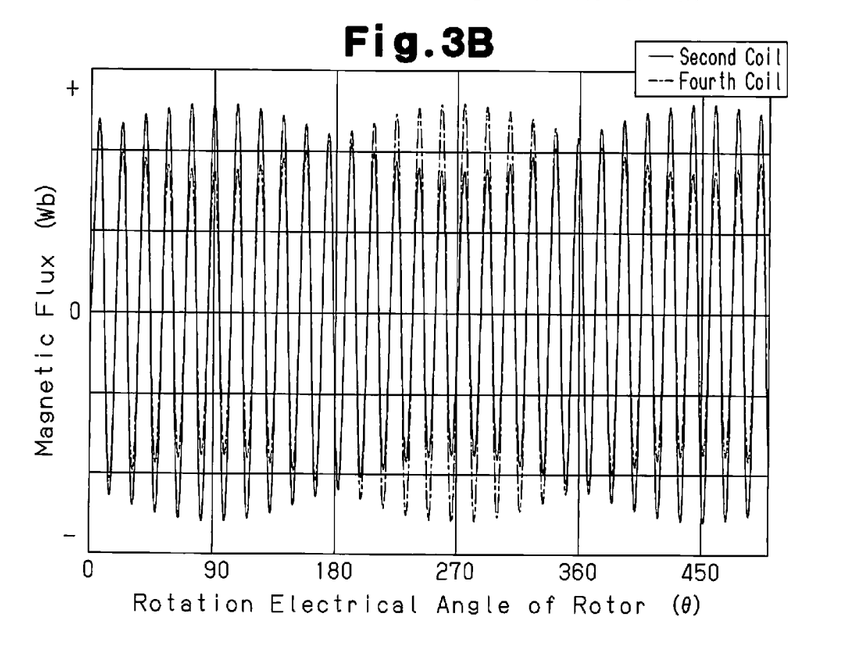
FIG. 3B is a graph showing the change characteristics of the magnetic flux of the coils when the rotor is rotating.
Figure 4A:
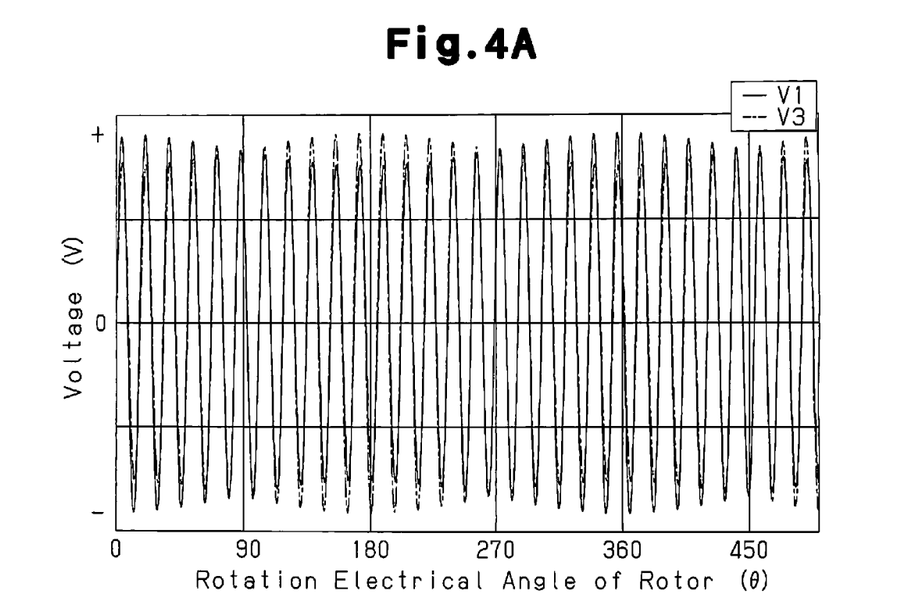
FIG. 4A is a graph showing the change characteristics of the voltage of the coils when the rotor is rotating.
Figure 4B:
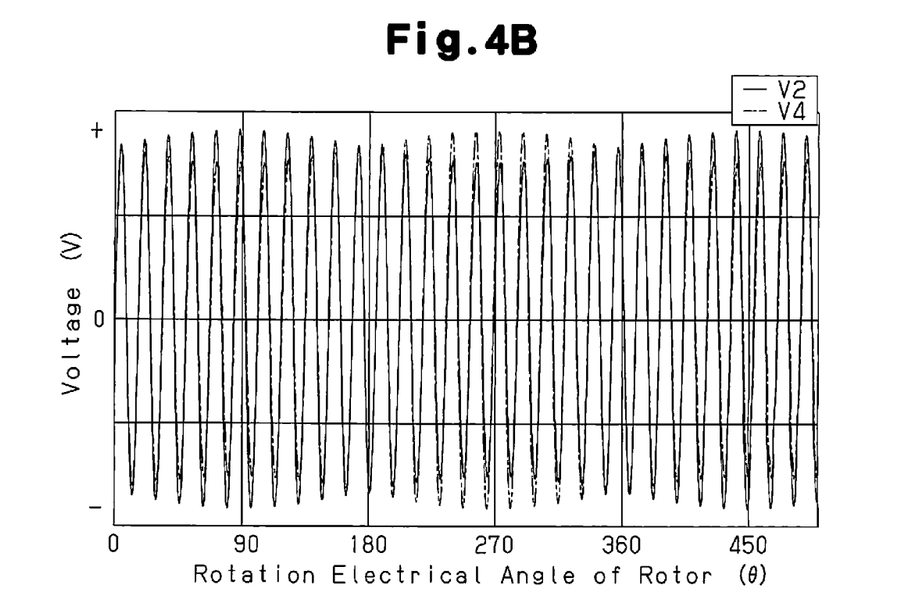
FIG. 4B is a graph showing the change characteristics of the voltage of the coils when the rotor is rotating.

FIGS. 3A and 3B show the magnetic flux characteristics of the coils C1 to C4 when the rotor 12 rotates counterclockwise at a rotational speed of 2000 rpm. FIGS. 4A and 4B show the characteristics of the voltages V1 to V4 when the rotor 12 rotates counterclockwise at a rotational speed of 2000 rpm. The position of the rotor 12 shown in FIG. 1 is a reference position for the rotation electrical angle θ of the rotor 12 shown in FIGS. 3 and 4. That is, the rotation electrical angle θ is set to zero degrees at the reference position. In other words, the reference position is a position at which the vertex of the protrusion on the outer circumferential surface of the rotor 12 is arranged in front of the tooth 23 around which the first coil C1 is wound.

FIGS. 3A and 4A respectively show the changes in the magnetic flux and the changes in the voltages V1, V3 of the first and third coils C1, C3. As shown in the drawings, the magnetic flux and the voltage V1 of the first coil C1 have a maximum value when the rotation electrical angle θ is zero degrees, and become a maximum value at 360 degree cycle from then on. The magnetic flux and the voltage V3 of the third coil C3 have a maximum value when the rotation electrical angle θ is 180 degrees, and become a maximum value at 360 degree cycle from then on.

FIGS. 3B and 4B show the changes in the magnetic flux and the changes in the voltages V2, V4 of the second and fourth coils C2, C4. As shown in the drawings, the magnetic flux and voltage V2 of the second coil C2 have a maximum value when the rotation electrical angle θ is 90 degrees, and become a maximum value at 360 degree cycle from then on. The magnetic flux and voltage V4 of the fourth coil C4 have a maximum value when the rotation electrical angle θ is 270 degrees, and become a maximum value at 360 degree cycle from then on.

Thus, the smaller the gap between the rotor 12 and each tooth 23 is, the greater the voltages V1 to V4 of the coils C1 to C4 become, and the voltages V1 to V4 of the coils C1 to C4 become a maximum value or a minimum value at the rotation electrical angle θ where the gap becomes the minimum or the maximum. The phase difference of the voltages V2, V3, V4 of the second to fourth coils C2 to C4 with respect to the voltage V1 of the first coil C1 are 90 degrees, 180 degrees, and 270 degrees in terms of the electrical angle (equal to the mechanical angle).

With regard to pairs among the coils C1 to C4, the voltages V1 to V4 of which have a phase difference of 180 degrees, that is, a pair of the first coil C1 and the third coil C3 and a pair of the second coil C2 and the fourth coil C4, the former pair C1, C3 is set as a first excitation coil group, and the latter pair C2, C4 is set as a second excitation coil group. The voltage obtained by combining the voltages V1, V3 of the first and third coils C1, C3 is obtained as a first phase output voltage E1 (sin voltage). Also, the voltage obtained by combining the voltages V2, V4 of the second and fourth coils C2, C4 is obtained as a second phase output voltage E2 (cos voltage). Since the voltage V3 of the third coil C3 is an opposite phase from the voltage V1 of the first coil C1, the first phase output voltage E1 is obtained by combining the voltage V1 and the voltage obtained by inverting the phase of the voltage V3. That is, the first phase output voltage E1 is represented by the equation E1=V1−V3. Similarly, the second phase output voltage E2 is represented by the equation E2=V2−V4.

Figure 5:
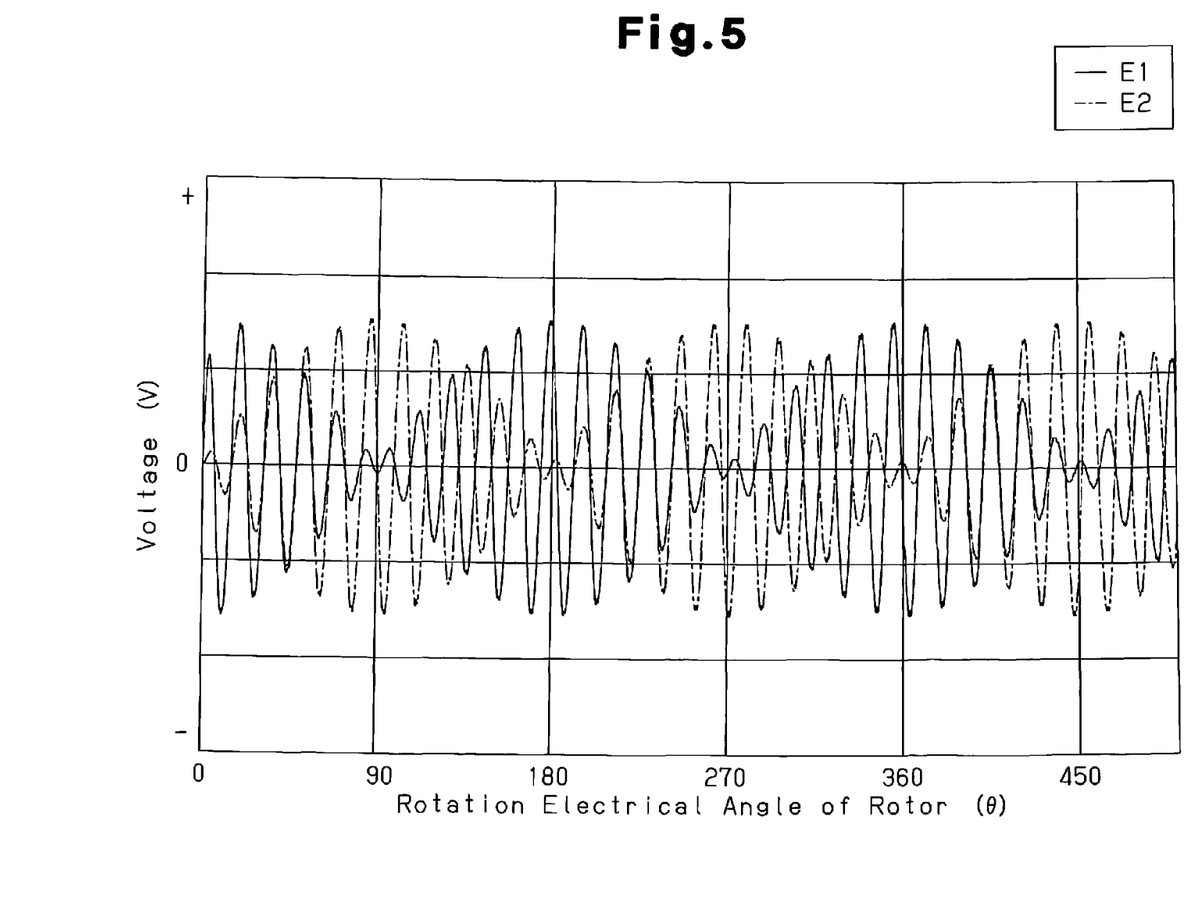
FIG. 5 is a graph showing the change characteristics of the voltage of the first phase output voltage and the second phase output voltage when the rotor is rotating.

FIG. 5 shows the change characteristics of the first phase output voltage E1 and the second phase output voltage E2 during rotation of the rotor 12. As shown in the drawing, the first phase output voltage E1 and the second phase output voltage E2 have a phase difference of 90 degrees in terms of the electrical angle, and the rotation electrical angle θ (or rotation mechanical angle) of the rotor 12 can be detected based on the first and second phase output voltages E1, E2. That is, the control section 20 receives the voltages V1 to V4 of the coils C1 to C4, computes the first and second phase output voltages E1, E2, and detects the rotation electrical angle θ (or the rotation mechanical angle) of the rotor 12 based on the first and second phase output voltages E1, E2. The number of slots (that is, the number of the teeth 23, and the number of the excitation coils) is set to, including the subsequent embodiments, a number that is four times the multiplication factor of angle, or an integer obtained by multiplying multiplication factor of angle by four and dividing the resultant by an odd number (1, 3, 5, 7, 9, . . . ).

The advantages of the first embodiment will now be described.

(1) The first phase output voltage E1 based on the voltages V1, V3 of the first excitation coil group including the first and third coils C1, C3 is generated. The second phase output voltage E2 based on the voltages V2, V4 of the second excitation coil group including the second and fourth coils C2, C4 is generated. The first and second phase output voltages E1, E2 are configured such that the phase difference is 90 degrees in terms of the electrical angle. The control section 20 detects the rotation electrical angle θ (or the rotation mechanical angle) from the first and second phase output voltages E1, E2. Therefore, the rotation electrical angle θ (or the rotation mechanical angle) of the rotor 12 is detected while having a simple structure that only includes an excitation coil to which an input voltage is supplied, and without providing a dedicated coil for output that does not receive an input voltage.

(2) The first excitation coil group and the second excitation coil group each include the pair of excitation coils having voltages of opposite phases (the first and third coils C1, C3, and the second and fourth coils C2, C4). The first phase output voltage E1 and the second phase output voltage E2 each have a voltage (E1=V1−V3, E2=V2−V4) obtained by combining the voltage of one of the pair of coils and the voltage obtained by inverting the phase of the other voltage. That is, the first excitation coil group and the second excitation coil group are each formed of multiple coils. The first phase output voltage E1 is generated by combining the voltages of the first and third coils C1, C3 of the first excitation coil group. The second phase output voltage E2 is generated by combining the voltages of the second and fourth coils C2, C4 of the second excitation coil group. Since the rotation electrical angle θ (or the rotation mechanical angle) of the rotor 12 is detected based on the first phase output voltage E1 and the second phase output voltage E2, the accuracy of angle detection is improved.

(3) The multiplication factor of angle of the rotor 12 is set to an odd number. The first excitation coil group includes the pair of the first and third coils C1, C3 arranged at a mechanical angle of 180 degree interval, and the second excitation coil group includes the pair of the second and fourth coils C2, C4 arranged at a mechanical angle of 180 degree interval. Thus, the voltages of the pair in the first excitation coil group and the voltages of the pair in the second excitation coil group can be set to opposite phases in terms of the electrical angle. As a result, the phase difference of the first phase output voltage E1 and the second phase output voltage E2 in terms of the electrical angle can be set to 90 degrees.

(4) The number of the teeth 23 is four, the number of the excitation coils (the coils C1 to C4) is four, and the multiplication factor of angle of the rotor 12 is set to seven. Since the number of the teeth 23 and the number of the excitation coils are four each, the rotation electrical angle θ (or the rotation mechanical angle) of the rotor 12 is detected in a suitable manner while simplifying the structure by relatively reducing the number of the teeth 23 and the excitation coils.

(5) The number of the teeth 23 is four, and the number of the excitation coils (the coils C1 to C4) is four. The coils C1 to C4 are wound such that the winding direction alternately changes in the circumferential direction. Therefore, while simplifying the structure by relatively reducing the number of the teeth 23 and the number of the excitation coils to four each, the rotation electrical angle θ (or the rotation mechanical angle) of the rotor 12 is detected in a suitable manner.

Second Embodiment

Figure 6:
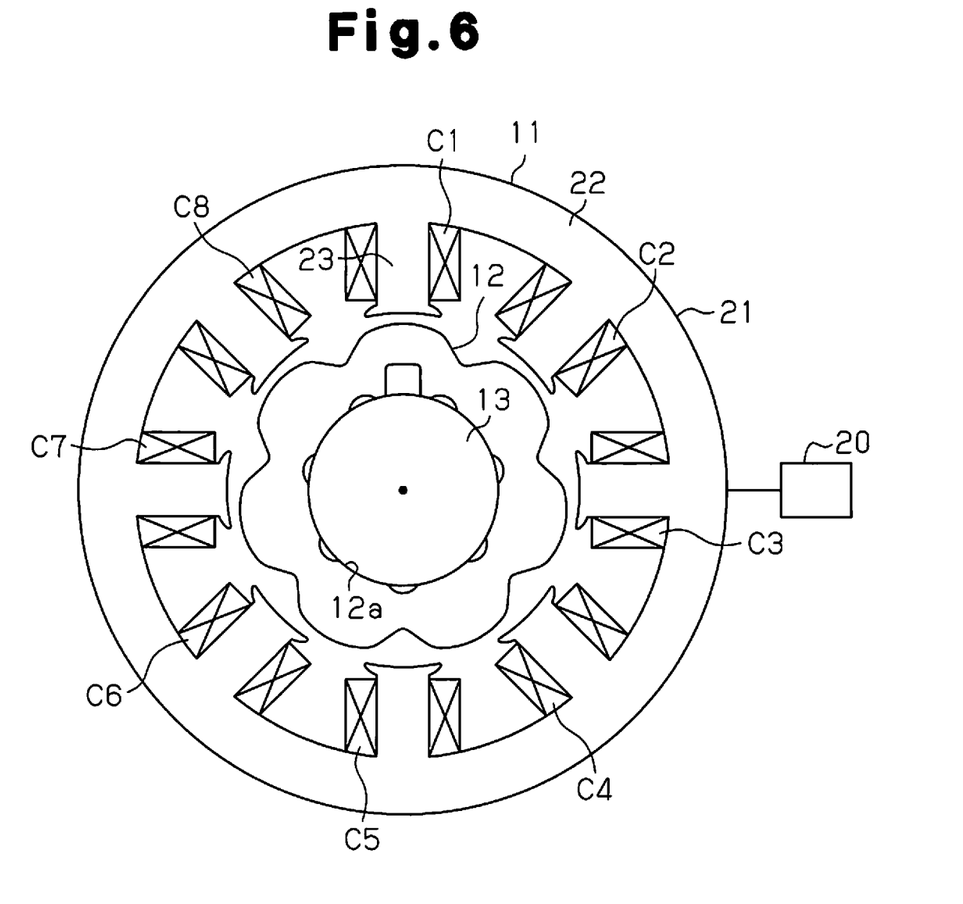
FIG. 6 is a schematic diagram illustrating a variable reluctance type angle sensor according to a second embodiment.

In the first embodiment, the number of the teeth 23 and the number of the excitation coils (the coils C1 to C4) is four each, and the multiplication factor of angle of the rotor 12 is seven, which forms a variable reluctance type angle sensor of 4s7×. A second embodiment provides a variable reluctance type angle sensor of 8s7× as shown in FIG. 6.

Figure 7:
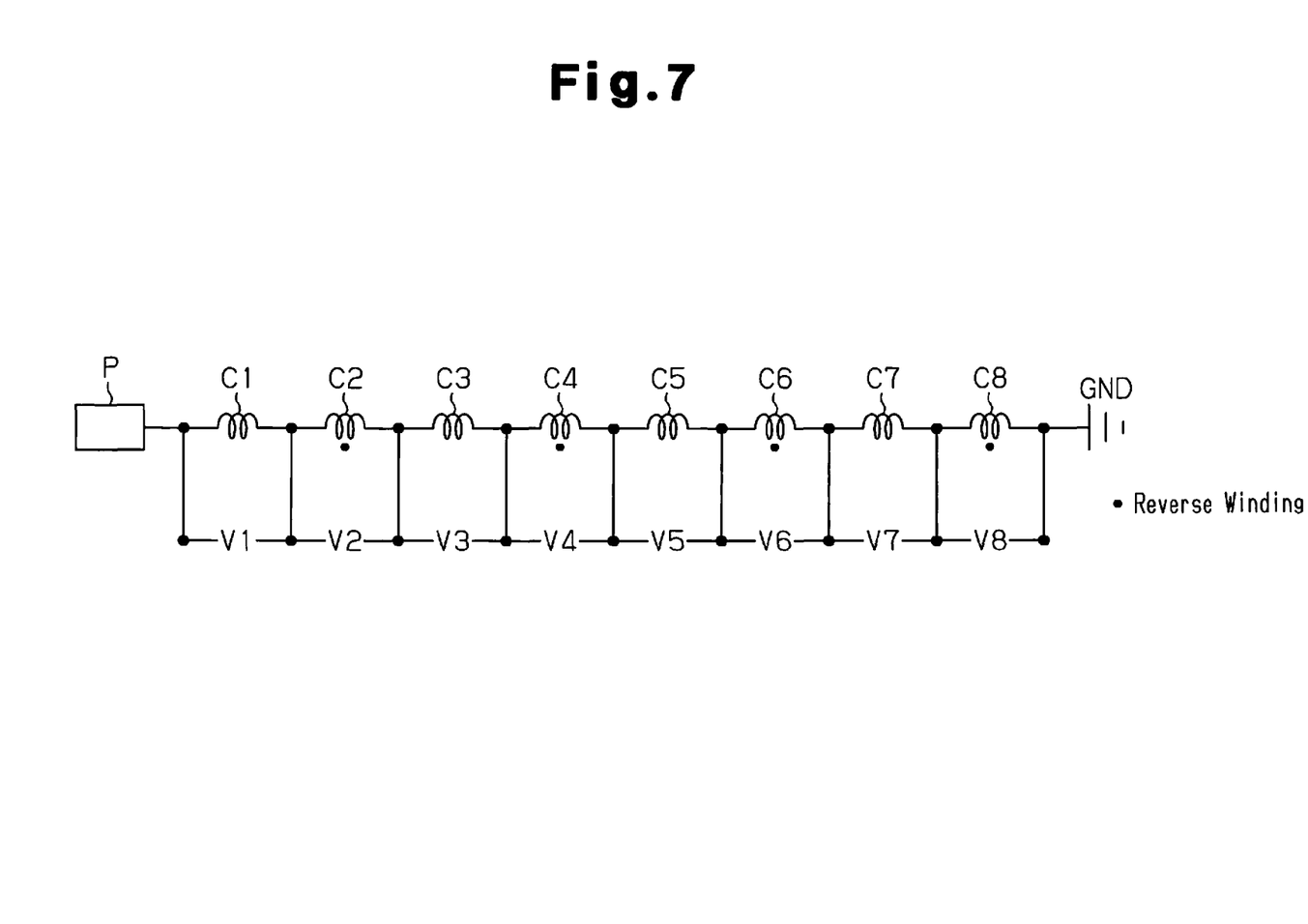
FIG. 7 is a schematic diagram illustrating the connection of the coils of the second embodiment.

As shown in the drawing, first to eighth coils C1 to C8 are wound about eight teeth 23 located at circumferentially equal intervals (315 degree intervals in terms of the electrical angle, 45 degree intervals in terms of the mechanical angle) clockwise in this order. The first to eighth coils C1 to C8 are formed by winding a single conductive wire about the teeth 23 continuously by concentrated winding. That is, the first to eighth coils C1 to C8 are connected in series as shown in FIG. 7. Also, like the first embodiment, the winding direction of the coils C1 to C8 is alternately reversed in the circumferential direction, and the circumferentially adjacent coils have different polarities from each other. Furthermore, the number of windings of the first to fourth coils C1 to C8 is set to be equal.

In the second embodiment, the first excitation coil group includes the first, second, fifth, and sixth coils C1, C2, C5, C6, and the second excitation coil group includes the third, fourth, seventh, and eighth coils C3, C4, C7, C8. The first phase output voltage E1 is represented by the equation E1=(V1−V5)+(V2−V6). The voltage (V1−V5) is a voltage obtained by combining the voltage V1 of the first coil C1 and the voltage obtained by inverting the voltage V5 of the fifth coil C5, which has an opposite phase from the voltage V1. The voltage (V2−V6) is a voltage obtained by combining the voltage V2 of the second coil C2 and the voltage obtained by inverting the voltage V6 of the sixth coil C6, which has an opposite phase from the voltage V2. That is, the first phase output voltage E1 is a voltage obtained by summing up the voltage (V1−V5) and the voltage (V2−V6). Similarly, the second phase output voltage E2 is represented by the equation E2=(V3−V7)+(V4−V8).

Figure 8:
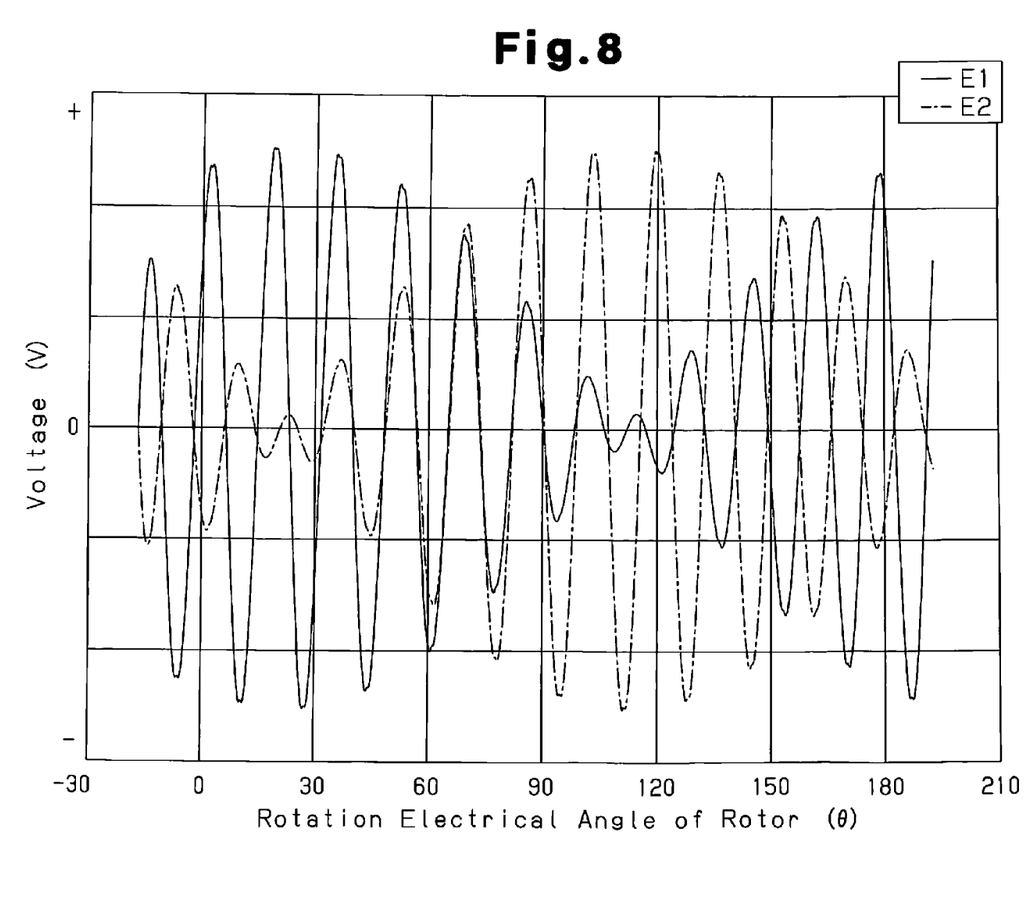
FIG. 8 is a graph showing the change characteristics of the voltage of the first phase output voltage and the second phase output voltage when the rotor is rotating.

FIG. 8 shows the change characteristics of the first phase output voltage E1 and the second phase output voltage E2 when the rotor 12 is rotated counterclockwise at a rotational speed of 2000 rpm. As shown in the diagram, the first phase output voltage E1 and the second phase output voltage E2 have a phase difference of 90 degrees in terms of the electrical angle, and the rotation electrical angle θ (or the rotation mechanical angle) of the rotor 12 is detected based on the first and second phase output voltages E1, E2. That is, the control section 20 computes the first and second phase output voltages E1, E2 from the voltages V1 to V8, and detects the rotation electrical angle θ (or the rotation mechanical angle) of the rotor 12 based on the first and second phase output voltages E1, E2.

The second embodiment has the following advantage in addition to the advantages substantially the same as the first embodiment.

(6) Since the first excitation coil group and the second excitation coil group are each formed of two pairs of coils, the accuracy of angle detection is further improved.

Third Embodiment

Figure 9:
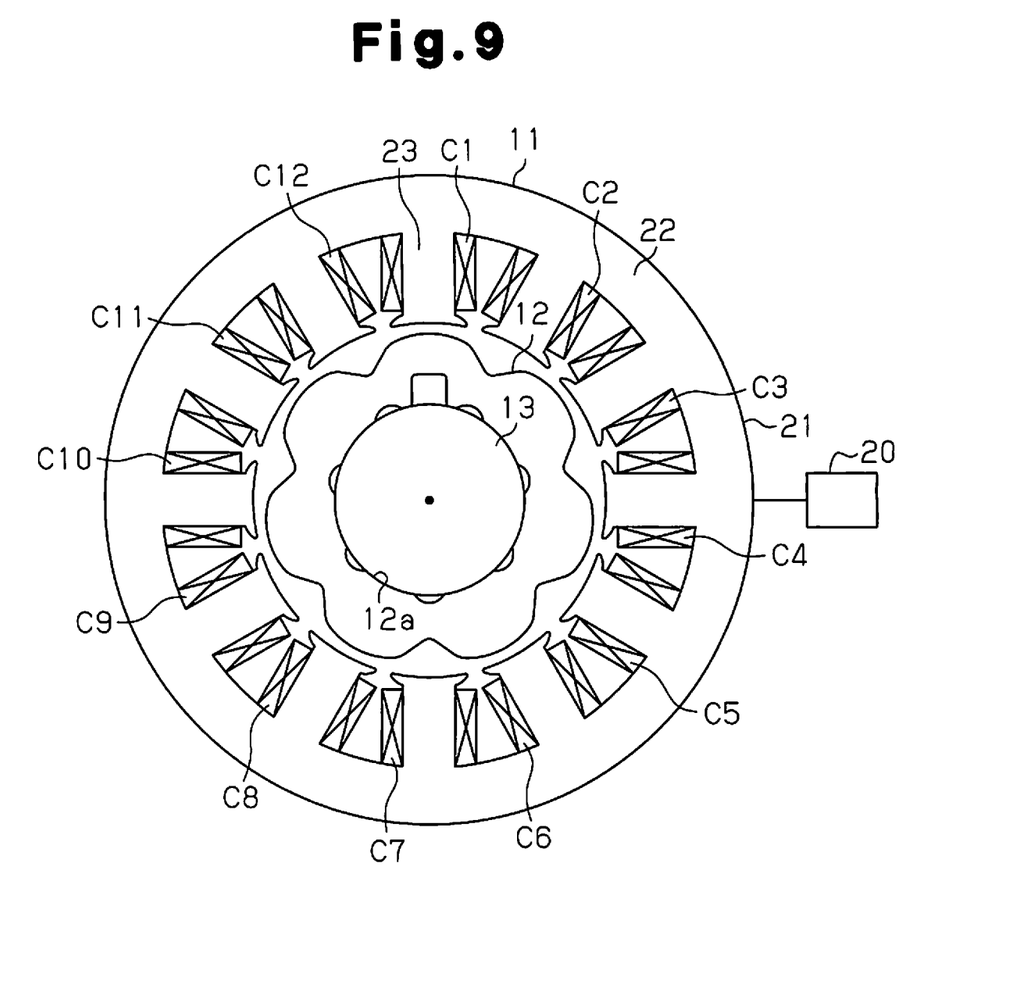
FIG. 9 is a schematic diagram illustrating a variable reluctance type angle sensor according to a third embodiment.

A third embodiment provides a variable reluctance type angle sensor of 12s7× as shown in FIG. 9.

Figure 10:
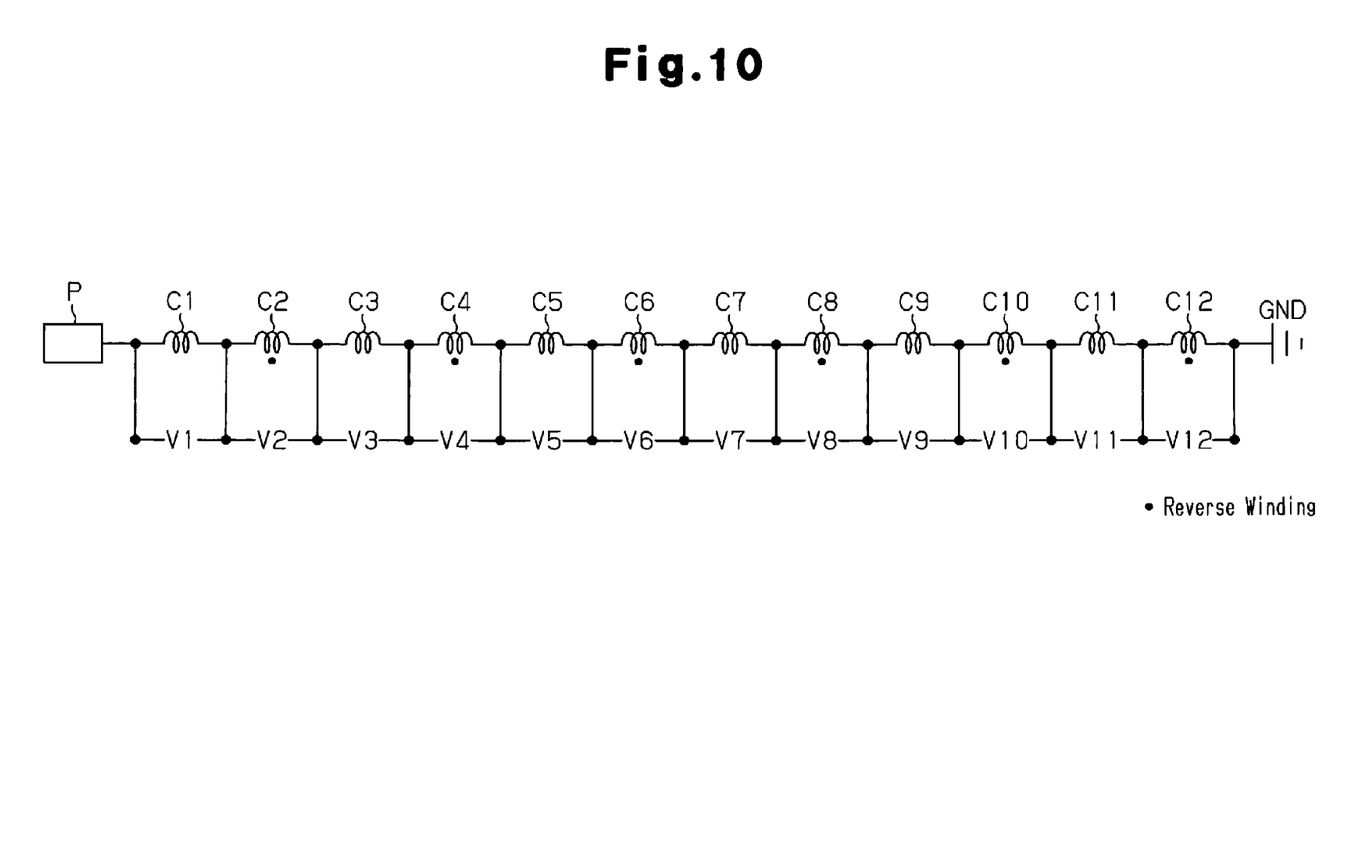
FIG. 10 is a schematic diagram illustrating the connection of the coils of the third embodiment.

As shown in the drawing, first to twelfth coils C1 to C12 are wound about twelve teeth 23 located at equal intervals in the circumferential direction (30 degree intervals in terms of the mechanical angle) clockwise in this order. The first to twelfth coils C1 to C12 are formed by winding a single conductive wire continuously about the teeth 23 by concentrated winding. That is, the first to twelfth coils C1 to C12 are connected in series as shown in FIG. 10. Also, like the first embodiment, the winding direction of the coils C1 to C12 is alternately reversed in the circumferential direction, and the circumferentially adjacent coils have different polarities from each other. Furthermore, the number of windings of the first to twelfth coils C1 to C12 is set all equal.

In the third embodiment, the first excitation coil group includes the first, second, sixth, seventh, eighth, and twelfth coils C1, C2, C6, C7, C8, C12, and the second excitation coil group includes the third, fourth, fifth, ninth, tenth, and eleventh coils C3, C4, C5, C9, C10, C11. The first phase output voltage E1 is represented by the equation E1=(V1−V7)+(V2−V8)+(V12−V6). The voltage (V1−V7) is the voltage obtained by combining the voltage V1 of the first coil C1 and the voltage obtained by inverting the voltage V7 of the seventh coil C7, which has an opposite phase from the voltage V1. The voltage (V2−V8) is the voltage obtained by combining the voltage V2 of the second coil C2 and the voltage obtained by inverting the voltage V8 of the eighth coil C8, which has an opposite phase from the voltage V2. The voltage (V12−V6) is the voltage obtained by combining the voltage V12 of the twelfth coil C12 and the voltage obtained by inverting the voltage V6 of the sixth coil C6, which has an opposite phase from the voltage V12. That is, the first phase output voltage E1 is the voltage obtained by summing up the voltages (V1−V7), (V2−V8), and (V12−V6). Similarly, the second phase output voltage E2 is represented by the equation E2=(V4−V10)+(V5−V11)+(V3−V9).

Figure 11:
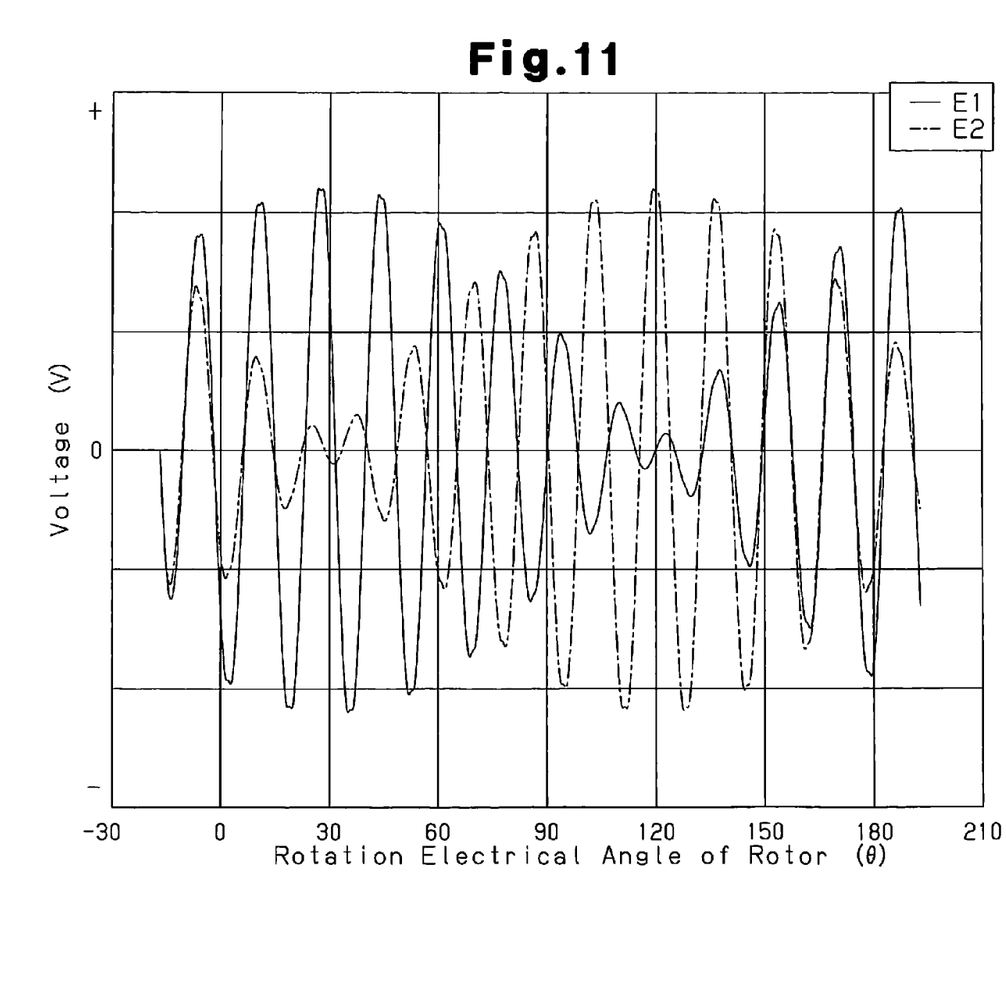
FIG. 11 is a graph showing the change characteristics of the voltage of the first phase output voltage and the second phase output voltage when the rotor is rotating.

FIG. 11 shows the change characteristics of the first phase output voltage E1 and the second phase output voltage E2 when the rotor 12 is rotated counterclockwise at a rotational speed of 2000 rpm. As shown in the drawing, the first phase output voltage E1 and the second phase output voltage E2 have a phase difference of 90 degrees in terms of the electrical angle, and the rotation electrical angle θ of the rotor 12 can be detected based on the first and second phase output voltages E1, E2. That is, the control section 20 receives the voltages V1 to V12 of the coils C1 to C12, computes the first and second phase output voltages E1, E2, and detects the rotation electrical angle θ of the rotor 12 based on the first and second phase output voltages E1, E2.

The third embodiment has the following advantage in addition to the advantages substantially the same as the first embodiment.

(7) Since the first excitation coil group and the second excitation coil group each includes three pairs of coils, the accuracy of angle detection is further improved.

Each of the embodiments of the present invention may be modified as follows.

The number of slots (the number of the teeth 23 and the coils) and the multiplication factor of angle of the rotor 12 may be changed from the above embodiments.

Figure 12:
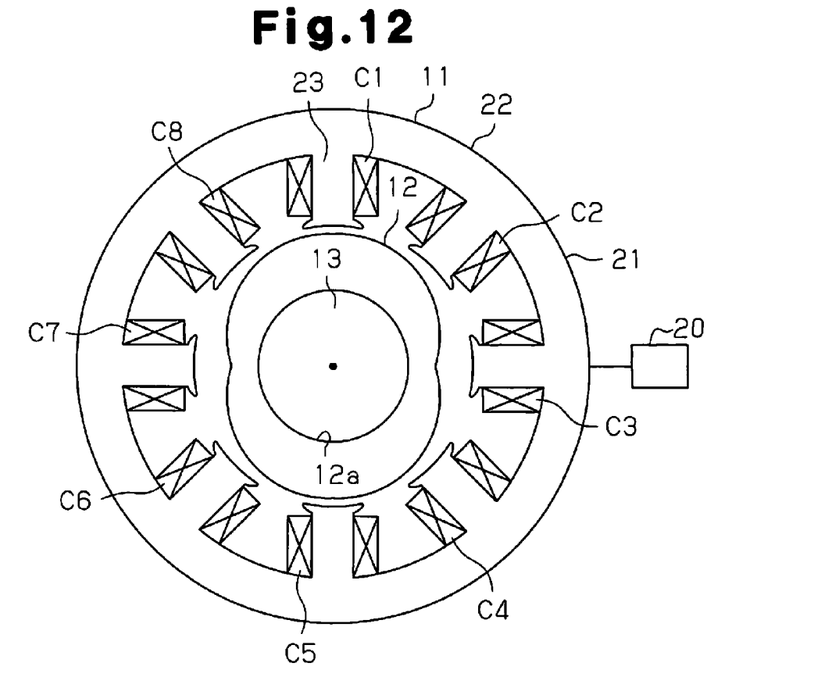
FIG. 12 is a schematic diagram illustrating a variable reluctance type angle sensor according to a modification.

Also, for example, as shown in FIG. 12, the number of slots and the multiplication factor of angle of the rotor 12 may be "8s2×". The structure of the stator 11 in the drawing is the same as the stator 11 of the second embodiment. As shown in FIG. 12, in the structure in which the multiplication factor of angle of the rotor 12 is set to an even number, pairs of coils in the first excitation coil group and the second excitation coil group each include two coils arranged at intervals of (360/A) degrees in terms of the electrical angle ((360/2A) degrees in terms of the mechanical angle) assuming that the multiplication factor of angle of the rotor 12 is represented by A. That is, in the structure shown in FIG. 12, since the multiplication factor of angle is two, the pair of coils include two coils arranged at 180 degree interval in terms of the electrical angle (90 degree intervals in terms of the mechanical angle). More specifically, the first excitation coil group includes the pair of the first coil C1 and the third coil C3, and the pair of the fifth coil C5 and the seventh coil C7. The second excitation coil group includes the pair of the second coil C2 and the fourth coil C4, and the pair of the sixth coil C6 and the eighth coil C8. The first phase output voltage E1 is represented by E1=(V1−V3)+(V5−V7), the second phase output voltage E2 is represented by E2=(V2−V4)+(V6−V8), and the first and second phase output voltages E1, E2 have a phase difference of 90 degrees in terms of the electrical angle.

As described above, in the structure in which the multiplication factor of angle of the rotor 12 is set to an even number, the pairs of coils in the first excitation coil group and the second excitation coil group each include two coils arranged at intervals of (360/A) degrees in terms of the electrical angle ((360/2A) degrees in terms of the mechanical angle). Thus, the voltages of the pair of excitation coils have opposite phases from each other. As a result, the phase difference of the first phase output voltage E1 and the second phase output voltage E2 in terms of the electrical angle can be set to 90 degrees, and the rotation electrical angle θ of the rotor 12 can be detected based on the first and second phase output voltages E1, E2.

In each of the above embodiments, the excitation coils are connected in series. That is, in the first embodiment, the first to fourth coils C1 to C4 are connected in series. In the second embodiment, the first to eighth coils C1 to C8 are connected in series. In the first embodiment, the first to twelfth coils C1 to C12 are connected in series. Instead, the excitation coils may be connected, for example, in parallel.

In each of the above embodiments, the first and second phase output voltages E1, E2 are obtained from the voltages of all the provided coils. That is, in the first embodiment, the first and second phase output voltages E1, E2 are obtained from the voltages of the four coils C1 to C4. In the second embodiment in which eight coils are provided, the first and second phase output voltages E1, E2 are obtained from the voltages of the coils C1 to C8. In the third embodiment, the first and second phase output voltages E1, E2 are obtained from the voltages of the twelve coils C1 to C12. However, the present invention is not particularly limited to this, and the first and second phase output voltages may be obtained from the voltages of some of the coils.

In each of the above embodiments, the phase difference of the first and second phase output voltages E1, E2 in terms of the electrical angle is set to 90 degrees. Alternatively, for example, the phase difference in terms of the electrical angle may be set to 120 degrees. In this case also, the same advantages obtained in the above described embodiments may be obtained.

Fourth Embodiment

Figure 13:
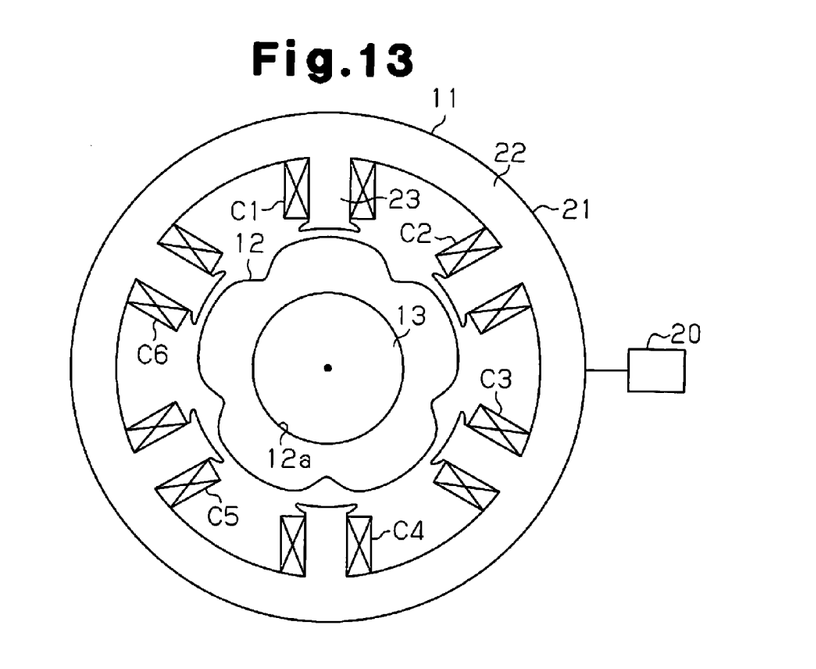
FIG. 13 is a schematic diagram illustrating a variable reluctance type angle sensor according to a fourth embodiment.

In the first to third embodiments, the output voltages E1, E2 of two phases are obtained from the voltages of the coils (excitation coils). The fourth embodiment differs in this point, and is an example of the structure in which output voltages of three or more phases are obtained from the voltages of the coils, and the angle is detected based on these output voltages. As shown in FIG. 13, the fourth embodiment is a variable reluctance type angle sensor of 6s5×.

Figure 14:
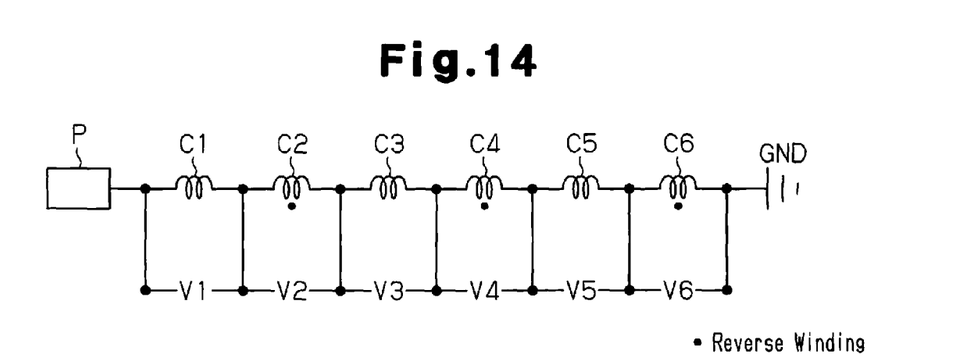
FIG. 14 is a schematic diagram illustrating the connection of the coils of the fourth embodiment.

As shown in the drawing, first to sixth coils C1 to C6 are wound about six teeth 23 located at equal intervals in the circumferential direction (60 degree intervals in terms of the mechanical angle) clockwise in this order. The first to sixth coils C1 to C6 are formed of a single conductive wire continuously wound about the teeth 23 by concentrated winding. That is, the first to sixth coils C1 to C6 are connected in series as shown in FIG. 14. Also, like the first embodiment, the winding direction of the coils C1 to C6 is alternately reversed in the circumferential direction, and the circumferentially adjacent coils have different polarities from each other. Furthermore, the number of windings of the first to sixth coils C1 to C6 is set all equal. The first to sixth coils C1 to C6 are formed to be capable of obtaining the respective voltages V1 to V6, and the voltages V1 to V6 of the coils C1 to C6 are output to the control section 20.

In such a variable reluctance type angle sensor, when the rotary shaft 13 and the rotor 12 are rotated, magnetic flux change occurs in the teeth 23 (the coils C1 to C6) due to variation in the gap permeance associated with the rotation, and the voltages V1 to V6 of the first to sixth coils C1 to C6 change accordingly.

The pair of the first coil C1 and the fourth coil C4, which forms the first excitation coil group, is located at an angular interval of (180+360) multiplied by a natural number in terms of the electrical angle in the circumferential direction (180 degree interval in terms of the mechanical angle), and is configured such that the winding direction is opposite from each other, that is, the pair of the first coil C1 and the fourth coil C4 have different polarities. Also, the first coil C1 and the fourth coil C4 have a phase difference of 180 degrees in terms of the electrical angle. That is, when the first coil C1 faces the top most portion of an arbitrary protrusion of the rotor 12, the fourth coil C4 faces the inner most portion of a recess of the rotor 12. As a result, the voltage V1 of the first coil C1 and the voltage V4 of the fourth coil C4 have the same phase. By summing up the voltages V1, V4 as they are, the first phase output voltage E1 is obtained and has, of course, the same phase and provides great output as a combined voltage. Similarly, the pair of the voltage V2 of the second coil C2 and the voltage V5 of the fifth coil C5, which form the second excitation coil group, have the same phase. The combined voltage, which is the sum of the voltages V2, V5, is obtained as the second phase output voltage E2. Similarly, the pair of the voltage V3 of the third coil C3 and the voltage V6 of the sixth coil C6, which form the third excitation coil pair, have the same phase, and the combined voltage obtained by summing up the voltages V3, V6 is obtained as the third phase output voltage E3.

Figure 15A:
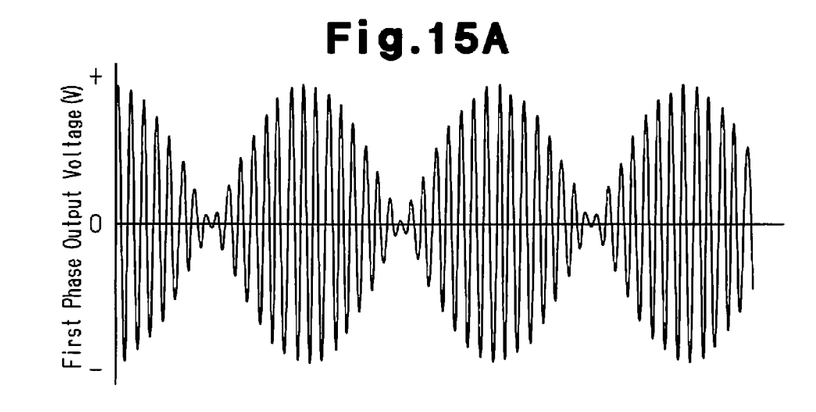
FIG. 15A is a graph showing the voltage change characteristics of the output voltages of three phases in the variable reluctance type angle sensor according to the fourth embodiment.
Figure 15B:
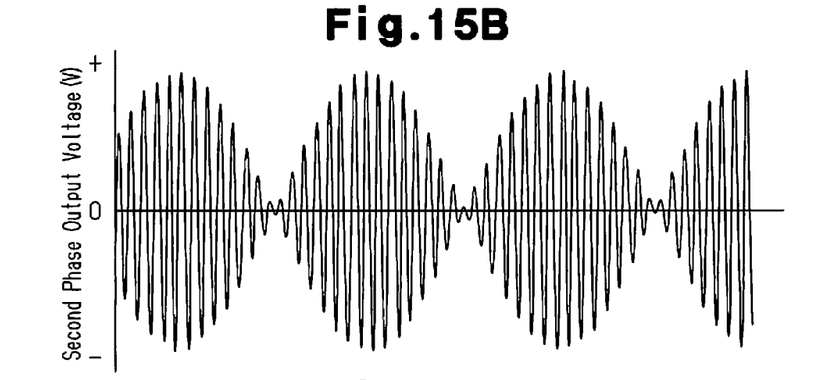
FIG. 15B is a graph showing the voltage change characteristics of the output voltages of three phases in the variable reluctance type angle sensor according to the fourth embodiment.
Figure 15C:
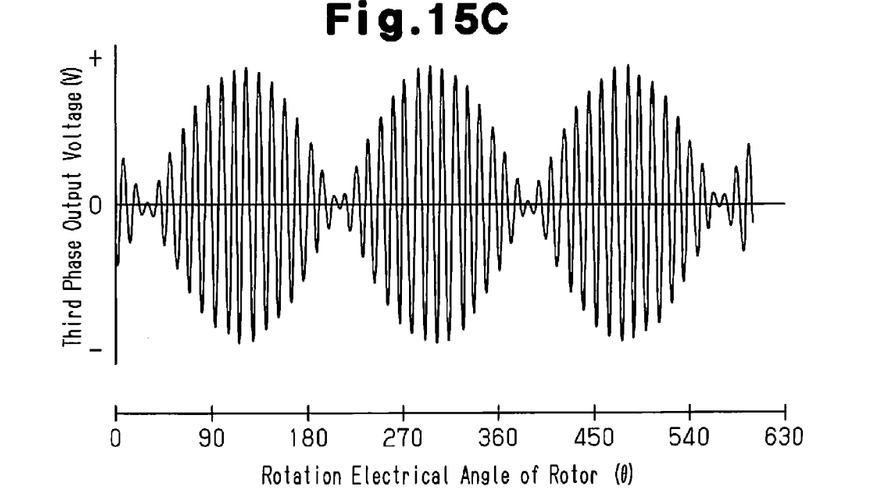
FIG. 15C is a graph showing the voltage change characteristics of the output voltages of three phases in the variable reluctance type angle sensor according to the fourth embodiment.

The output voltages E1 to E3 of the phases are shown in FIGS. 15A, 15B, and 15C. As shown in the diagrams, the output voltages E1 to E3 are amplitude modulated signals, which are modulated in a sinusoidal fashion. The output voltages E1 to E3 have a phase difference of 120 degrees from one another.

The control section 20 detects the rotation electrical angle θ (or the rotation mechanical angle) of the rotor 12 based on detector signals of three phases obtained by synchronous rectification (detection) of the output voltages E1 to E3. If the control section 20 determines that there is an abnormality in any of the output voltages E1 to E3 due to some kind of failure, for example, when the output voltage value becomes less than a predetermined threshold value, the control section 20 detects the rotation electrical angle θ (or the rotation mechanical angle) based on the two output voltages other than the faulty output voltage among the output voltages E1 to E3. Thus, the angle is detected in a stable manner. If there is no abnormality in any of the output voltages E1 to E3, the rotation electrical angle θ (or the rotation mechanical angle) may be detected from the output voltages E1 to E3 of all three phases, or the rotation electrical angle θ (or the rotation mechanical angle) may be detected from the output voltages of two phases (arbitrary) among the output voltages E1 to E3.

The fourth embodiment is a variable reluctance type angle sensor of 6s5×, but is not limited to this. The number of slots (the number of the teeth 23 and the number of the coils C1 to C6) and the multiplication factor of angle of the rotor 12 may be varied from the above embodiments. Also, the fourth embodiment has the structure in which the output voltages E1 to E3 of three phases are obtained, but the embodiment is not limited to this. The sensor may be formed to obtain output voltages of four or more phases that have different phases from one another. Also, in the fourth embodiment, the coils C1 to C6 are connected in series. Instead, for example, the coils C1 to C6 may be connected in parallel.

The advantages of the fourth embodiment will now be described.

(8) The control section 20 obtains the three phases of output voltages E1 to E3, which have different phases from one another, based on the voltages V1 to V6 of the coils C1 to C6, and detects the rotation electrical angle θ (or the rotation mechanical angle) of the rotor 12 based on the output voltages E1 to E3. Therefore, the rotation electrical angle θ (or the rotation mechanical angle) of the rotor 12 can be detected while having a simple structure including only the excitation coils (the coil C1 to C6) to which the input voltage is supplied, and without providing a dedicated coil for output to which the input voltage is not supplied.

(9) The rotation electrical angle θ (or the rotation mechanical angle) of the rotor can be detected based on the output voltages of two phases among the output voltages E1 to E3 of three phases. Thus, even if some phases of the output voltages E1 to E3 become faulty, the rotation electrical angle θ (or the rotation mechanical angle) of the rotor 12 can be detected as long as normal two phases of the output voltages are obtained. This allows stable angle detection.

(10) The phase difference of the output voltages E1 to E3 of three phases is set to 120 degrees from one another. Thus, even if one phase of the output voltages E1 to E3 becomes faulty, the rotation electrical angle θ (or the rotation mechanical angle) of the rotor 12 can be detected in a suitable manner based on the remaining normal output voltages of two phases.

(11) The rotation electrical angle θ (or the rotation mechanical angle) of the rotor 12 can be detected based on all the first phase to third phase output voltages E1 to E3. Thus, the accuracy of angle detection is improved by detecting the rotation electrical angle θ (or the rotation mechanical angle) of the rotor 12 based on all the first phase to third phase output voltages E1 to E3.

(12) Since the phase difference of the first phase to third phase output voltages E1 to E3 is set to 120 degrees, the rotation electrical angle θ (or the rotation mechanical angle) of the rotor 12 can be detected based on two of the first phase to third phase output voltages E1 to E3. The rotation electrical angle θ (or the rotation mechanical angle) of the rotor 12 can also be detected based on all the first phase to third phase output voltages E1 to E3.

(13) The first to third excitation coil groups each include a pair of excitation coils (the first and fourth coils C1, C4, the second and fifth coils C2, C5, and the third and sixth coils C3, C6) having the voltages of the same phase. The first phase to third phase output voltages E1 to E3 are respectively obtained by combining the voltages of the pair of coils. Therefore, the first to third excitation coil groups each include multiple coils. The first phase output voltage E1 is generated by combining the voltages of the first and fourth coils C1, C4 of the first excitation coil group, the second phase output voltage E2 is generated by combining the voltages of the second and fifth coils C2, C5 of the second excitation coil group, and the third phase output voltage E3 is generated by combining the voltages of the third and sixth coils C3, C6 of the third excitation coil group. Since the rotation electrical angle θ (or the rotation mechanical angle) of the rotor 12 is detected based on the first phase to third phase output voltages E1 to E3, the accuracy of angle detection is improved.

(14) The multiplication factor of angle of the rotor 12 is set to an odd number, and the pair of excitation coils in each of the first to third excitation coil groups includes two excitation coils (the first and fourth coils C1, C4, the second and fifth coils C2, C5, and third and sixths coils C3, C6) arranged at an angular interval of (180+360) multiplied by a natural number in terms of the electrical angle (180 degree interval in terms of the mechanical angle). Thus, the voltages of the pair of coils in each phase can be set to the same phase.

(15) The number of the teeth 23 is set to six, the number of the excitation coils (the coils C1 to C6) is set to six, and the multiplication factor of angle of the rotor 12 is set to five. Therefore, the rotation electrical angle θ (or the rotation mechanical angle) of the rotor 12 can be detected in a suitable manner while simplifying the structure by relatively reducing the number of the teeth 23 and the number of the coils C1 to C6 to six.

The invention claimed is:

1. A variable reluctance type angle sensor, comprising:
a stator including a core member, which has a plurality of teeth arranged in a circumferential direction, and a plurality of excitation coils respectively wound about the teeth such that magnetic poles of the teeth have different polarities alternately in the circumferential direction, wherein an input voltage is supplied to the excitation coils, only a single one of the excitation coils is wound about each of the teeth, the excitation coils are divided into either one of first and second excitation coil groups, the first and second excitation coil groups each include a pair of the excitation coils having voltages of opposite phases from each other, a first phase output voltage and a second phase output voltage are respectively generated by combining the voltage of one of the pair of the excitation coils and the voltage generated by inverting the phase of the voltage of the other one of the pair of the excitation coils;
a rotor radially facing the teeth of the stator, wherein the rotor has a shape such that gap permeance with respect to the stator changes in a sinusoidal fashion in accordance with the rotational angle of the rotor; and
a computation section, wherein the computation section obtains the first phase and second phase output voltages and detects the rotational angle of the rotor based on the first phase and second phase output voltages.

2. The variable reluctance type angle sensor according to claim 1, wherein
the first phase output voltage based on the voltage of the first excitation coil group and the second phase output voltage based on the voltage of the second excitation coil group are generated such that the phase difference between the first phase output voltage and the second phase output voltage is 90 degrees, and
the computation section detects the rotational angle of the rotor based on the first and second phase output voltages.

3. The variable reluctance type angle sensor according to claim 1, wherein
a multiplication factor of the angle of the rotor is set to an odd number, and
the pair of excitation coils in each of the first excitation coil group and the second excitation coil group includes two of the excitation coils arranged at an interval of 180 degrees in terms of a mechanical angle.

4. The variable reluctance type angle sensor according to claim 3, wherein
the number of the teeth is four, and the number of the excitation coils is four, and
the multiplication factor of the angle of the rotor is set to seven.

5. The variable reluctance type angle sensor according to claim 1, wherein
a multiplication factor of angle of the rotor is set to an even number, and
assuming that the multiplication factor of angle of the rotor is represented by A, the pair of excitation coils in each of the first excitation coil group and the second excitation coil group includes two of the excitation coils arranged at an interval of (360/2A) degrees in terms of a mechanical angle.

6. The variable reluctance type angle sensor according to claim 1, wherein
the number of the teeth and the number of the excitation coils are four, and
the winding direction of the excitation coils are alternately reversed in the circumferential direction.

* * * * *